(12) United States Patent
van der Burgt et al.

(10) Patent No.: US 12,508,125 B2
(45) Date of Patent: Dec. 30, 2025

(54) ELECTROSPUN SUTURE RING

(71) Applicant: Xeltis AG, Zurich (CH)

(72) Inventors: Vivian van der Burgt, Eindhoven (NL); Susana Amorim Lopes, Eindhoven (NL); Betty Baelus, Eindhoven (NL); Roland Lambertus Joannes Lalieu, Weert (NL); Martijn Antonius Johannes Cox, Budel (NL)

(73) Assignee: Xeltis AG, Zurich (CH)

( * ) Notice: Subject to any disclaimer, the term of this patent is extended or adjusted under 35 U.S.C. 154(b) by 908 days.

(21) Appl. No.: 17/296,802

(22) PCT Filed: Dec. 5, 2019

(86) PCT No.: PCT/EP2019/083782
§ 371 (c)(1),
(2) Date: May 25, 2021

(87) PCT Pub. No.: WO2020/115188
PCT Pub. Date: Jun. 11, 2020

(65) Prior Publication Data
US 2022/0023034 A1    Jan. 27, 2022

Related U.S. Application Data

(60) Provisional application No. 62/775,671, filed on Dec. 5, 2018.

(51) Int. Cl.
*A61F 2/24* (2006.01)
*A61F 2/00* (2006.01)
*D01D 5/00* (2006.01)

(52) U.S. Cl.
CPC .......... *A61F 2/2409* (2013.01); *A61F 2/0077* (2013.01); *A61F 2002/0081* (2013.01);
(Continued)

(58) Field of Classification Search
CPC ............... A61F 2/0077; A61F 2/2409; A61F 2230/0065; A61F 2/2412; A61F 2240/001
See application file for complete search history.

(56) References Cited

U.S. PATENT DOCUMENTS 3,774,060 A * 11/1973 Sharpe ............... H02K 9/19
310/61
5,104,406 A * 4/1992 Curcio ............... A61F 2/2409
623/2.39
(Continued)

FOREIGN PATENT DOCUMENTS

WO     WO9715245 A1    5/1997
WO     WO1997015245   5/1997
(Continued)

OTHER PUBLICATIONS

Sijbesma (1997) Reversible Polymers Formed from Self-Complementary Monomers Using Quadruple Hydrogen Bonding, Science 278, 1601-1604.

*Primary Examiner* — Sarah W Aleman
(74) *Attorney, Agent, or Firm* — LUMEN PATENT FIRM

(57) ABSTRACT

A medical implant is provided defined as an electrospun hollow-cored porous suture ring. The suture ring is a continuous ring made by rolling up circular sheet of electrospun material, which was electrospun over a cylindrical target. The suture ring, upon implantation, is capable of being absorbed and replaced by natural tissue due to ingrowth of cells and nutrients into pores of the electrospun hollow-cored biodegradable suture ring. The suture ring addresses at least some of the existing problems with suture or sewing rings.

7 Claims, 4 Drawing Sheets

(52) U.S. Cl.
CPC . *A61F 2210/0004* (2013.01); *A61F 2240/001* (2013.01); *D01D 5/0084* (2013.01)

(56) References Cited

U.S. PATENT DOCUMENTS

| | | | | |
|---|---|---|---|---|
| 7,935,144 | B2* | 5/2011 | Robin | A61F 2/2418 623/2.11 |
| 2003/0135270 | A1 | 7/2003 | Breznock | |
| 2004/0037813 | A1* | 2/2004 | Simpson | A61L 15/32 424/443 |
| 2011/0066237 | A1* | 3/2011 | Matheny | A61F 2/2412 623/2.41 |
| 2014/0081391 | A1* | 3/2014 | Ruyra-Baliarda | A61B 17/0482 623/2.17 |
| 2016/0143732 | A1* | 5/2016 | Glimsdale | A61F 2/2418 29/525.09 |
| 2018/0325646 | A1* | 11/2018 | Burke | A61L 33/0005 |
| 2019/0298515 | A1* | 10/2019 | Burriesci | A61F 2/2415 |
| 2020/0054448 | A1* | 2/2020 | Badhwar | A61F 2/2412 |

FOREIGN PATENT DOCUMENTS

| | | |
|---|---|---|
| WO | WO2001012105 | 2/2001 |
| WO | WO2001049217 | 7/2001 |

\* cited by examiner

310

300

ELECTROSPUN SUTURE RING

FIELD OF THE INVENTION

This invention relates to suture rings for medical applications.

BACKGROUND OF THE INVENTION

Most commonly used heart valve replacements today are bioprosthetic heart valves (100 in FIG. 1), which typically contain mainly animal-derived tissue as leaflet material 110. Disadvantages of using animal-derived tissue are known and relate to tissue sourcing, xenogeneic material, yield issues, possible calcification, glutaraldehyde storage and subsequent rinsing prior to the procedure. Durability of bioprosthetic heart valves is typically limited to 10 to 15 years in vivo, after which a reintervention or reoperation is needed.

A suture ring or sewing ring 120 is used to sew the heart valve to the patient's heart tissue. Suture rings are the only component of the surgical valves in direct contact with the patients' anatomy. The suture ring could be made from a knit fabric tube which is rolled into a ring form and which is secured about the heart valve in the circumferential groove. Alternatively, suture rings are often made from silicon covered with synthetic material (FIG. 1).
WO2001012105 describes the manufacture of a suture ring from autologous tissue. US20030135270 describes a suture ring having partial coating of anti-thrombotic/anti-fibrotic/anti-pannus material like polyurethane.

Existing suture or sewing rings have the following disadvantages.

Suture rings are made from synthetic materials that could lead to thrombus, fibrosis and pannus in the replacement valve. These conditions can hinder the functioning of the replacement valve, and over time may require replacement of the prosthetic valve.

If the patient develops a septic infection after implantation, the bacteria associated with such infections often attach to the synthetic material of the suture rings. Once the bacteria contaminate the suture ring, the infection is extremely difficult to eradicate. Failure to control the infection could ultimately necessitate the surgical replacement of the prosthetic valve.

Accordingly, there is a need in the art for better suture rings that are less susceptible to thrombus, fibrosis and pannus as well as bacteria attachment.

SUMMARY OF THE INVENTION

The present invention provides a suture ring, defined as a medical implant, that will at least overcome some of the problems in the art. The medical implant is an electrospun hollow-cored porous suture ring. The electrospun hollow-cored porous suture ring is a continuous ring which has been the result of a rolled-up circular sheet of electrospun material.

The porous nature of the suture ring is important as it makes the suture ring bioabsorbable and therewith capable of being absorbed and replaced by natural tissue due to ingrowth of cells and nutrients into pores of the electrospun hollow-cored biodegradable suture ring. The pore size distribution of the pores is 5 to 50 micrometers.

The electrospun hollow-cored porous suture ring defines: a hollow core diameter which is between 0.1-3 millimeters, a wall thickness which is between 100-1000 micrometers, and an overall inner ring diameter which depends on its application and is between 10-22 millimeters (e.g. a pediatric valve application), 18-28 millimeters (e.g. an aortic valve application), or 25-40 millimeters (e.g. a mitral valve annulus application).

In one embodiment, the medical implant further includes a heart valve leaflet to which the electrospun hollow-cored porous suture ring can be attached.

The invention is also a method of making a medical implant defining the steps of electrospinning a polymer coating on a cylindrical target forming a cylindrical electrospun sheet, whereby the cylindrical target defines a longitudinal axis, rolling up the cylindrical electrospun sheet over the longitudinal axis into a ring, and removing the rolled-up ring from the cylindrical target resulting in an electrospun hollow-cored suture ring defining a hollow-core diameter, a wall thickness and an overall ring diameter.

The method is further characterized by forming a sacrificial electrospun circular sheet. The hollow-core is formed by the step of rolling up forming the sacrificial electrospun circular sheet and then removing the sacrificial electrospun circular sheet. The step of removing is for example accomplished by using a solvent, resulting in the hollow core. Specifically, in one example, the electrospun circular sheet has a hollow core by starting to roll up a sheet of PEO followed by rolling a sheet of UPy material. The PEO is then later dissolved in water resulting in the hollow core of the suture ring.

Embodiments of the invention have the following advantages over existing approaches.

The hollow-cored porous suture ring has no begin or end and thus no weak spots (current suture rings have gluing points or sutures).

The hollow-cored porous suture ring is flexible, yet strong and can be adjusted to the patients' anatomy (non-scalloped/planar annulus—mitral and tricuspid valves, or scalloped annulus—aortic and pulmonary valves).

The hollow feature of the hollow-cored porous suture ring allows proper placement of the surgical annular sutures, potentially with very low insertion forces and an adequate initial resistance—high insertion forces are undesirable as they may damage the sewing cuff. The hollow feature is thus a must have to create a flexible suture ring.

Since the hollow-cored porous suture ring is fully bioabsorbable (aka biodegradable). After having been implanted, over time, there will be no artificial part left in the body after the stimulation and acceleration process as well as the biodegradation. Since the hollow-cored porous suture ring is only necessary during implantation this is a big advantage compared to suture rings used at the moment. State of the art silicone/metal sewing rings encapsulated in a sewing cuff (made of synthetic fabric) attracts often bacteria and can lead to thrombus, pannus or fibrosis.

An electrospun suture ring made from biodegradable polymer enables the Endogenous Tissue Restoration (ETR) process starting at the base of the leaflet where cell and tissue ingrowth will incorporate the suture ring into the patients' anatomy. In addition, there will be reduced encapsulation (thrombus, pannus and fibrosis).

The electrospun production method of the hollow-cored porous suture ring may reduce assembly steps and ease the assembly procedure (e.g. connection of the suture ring to the valve frame). If the material of the hollow-cored porous suture ring is the same as the material of the covering layer connection is easier.

DETAILED DESCRIPTION

Pure polymer valves may overcome the problems in the art related to the use of animal-derived tissue. In this context, pure is defined or understood as free of animal derived tissue. Besides improving manufacturability and solving current issues with animal tissue sourcing, pure polymer valves also avoid the need for glutaraldehyde treatment and rinsing, potentially reducing calcification and improving long term durability. Therefore, one embodiment of the invention is a heart valve where the leaflets are composed of a polymer material, preferably that enable ETR. In addition, this invention provides heart valves where the leaflets are made of bioabsorbable supramolecular polymers, preferably that enable ETR.

Figure 1:
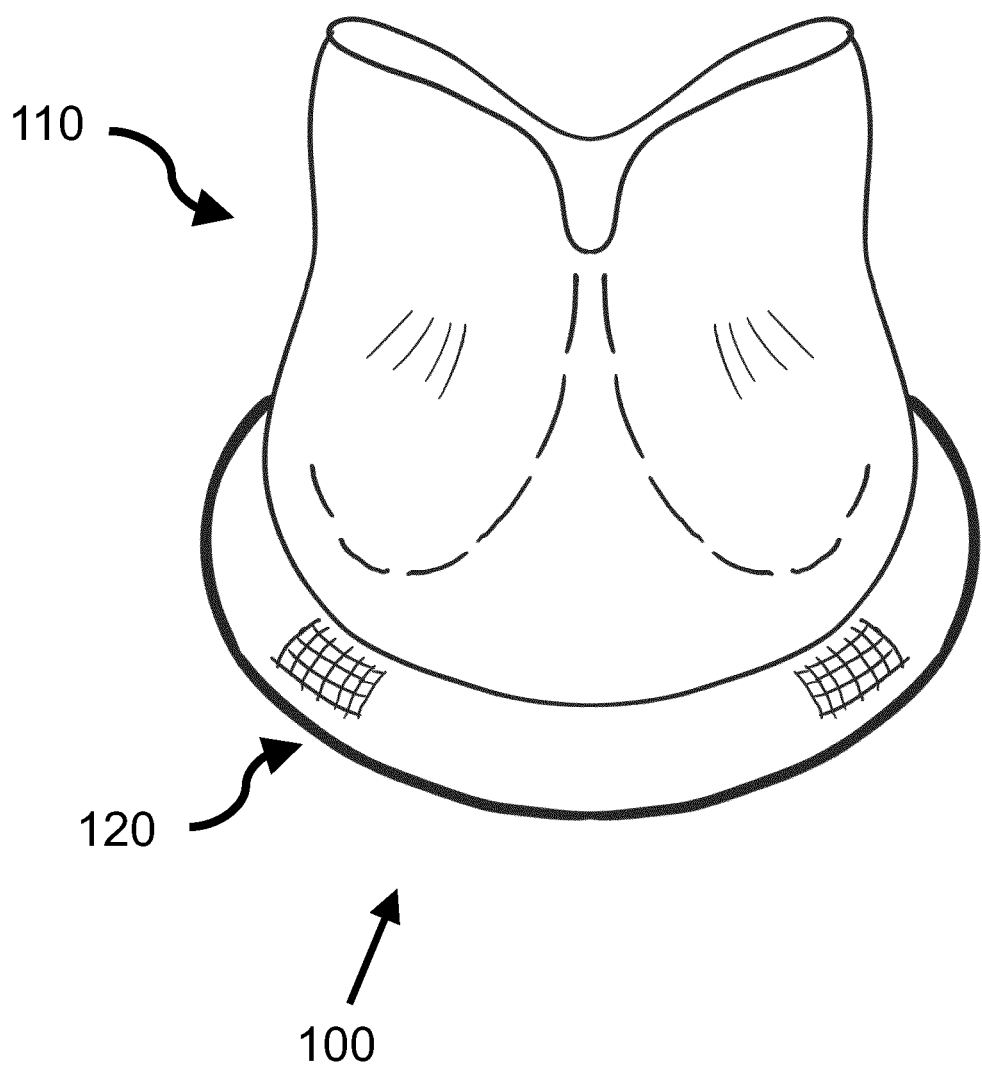
FIG. 1 shows 100 according to an exemplary embodiment of an existing sewing ring 120 being a silicon ring covered with synthetic fabric.
Figure 2:
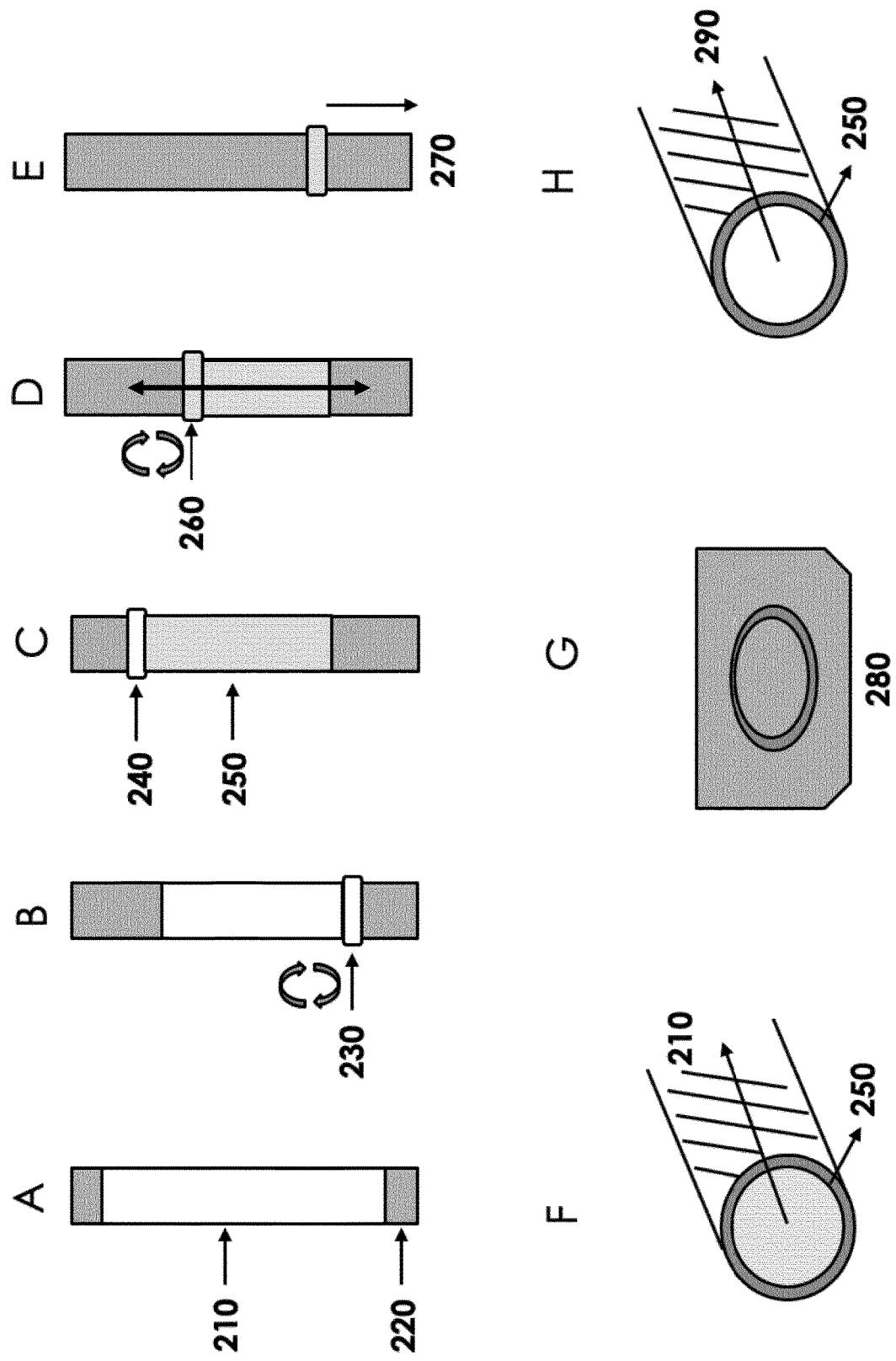
FIG. 2 shows according to an exemplary embodiment of the invention a production method for making a hollow-cored porous suture ring using electrospinning. A longitudinal axis is defined in aspect D which defines the longitudinal axis. When the method is completed, the electrospun hollow-cored porous suture ring is a continuous ring being a rolled-up circular sheet of electrospun material rolled up over the longitudinal axis of the circular sheet.

In another embodiment, the invention is a suture ring for the heart valve. The suture ring is electrospun from a polymer material defined infra, and preferably bioabsorbable. A new production method has been developed to create this electrospun sewing ring according to steps A-E and G (FIG. 2):
 A. A solvable polymer coating 210 is spun on a cylindrical target 220.
 B. The solvable polymer coating is rolled-up 230 on the target until it forms a ring.
 C. Polymer 250 is spun as a coating over the solvable polymer ring 240 and over the cylindrical target 220.
 D. The polymer scaffold is rolled-up over the solvable polymer ring as shown by 260 and over the longitudinal axis (straight arrow), thus forming a ring with an inner solvable polymer and an outer shell of the polymer.
 E. The ring is removed from the target by rolling of as shown by 270.
 F. Cross section of ring before dissolving solvable polymer in water.
 G. The inner solvable polymer ring is dissolved in water overnight as shown by 280.
 H. Cross section of the hollow polymer ring (290 indicates hollow space).

Figure 3:
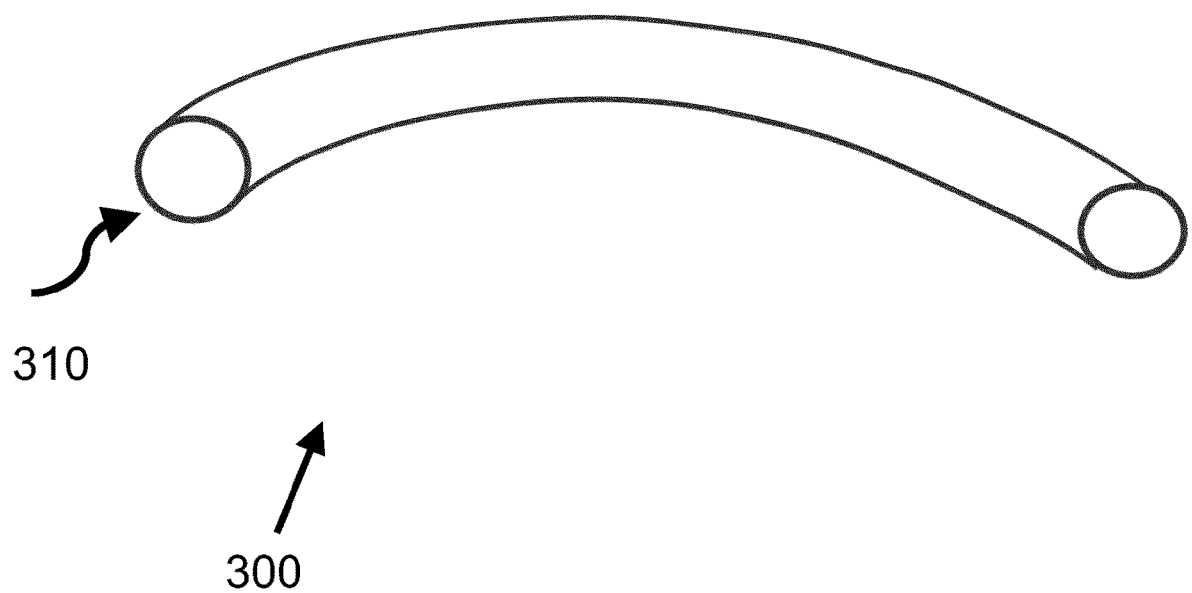
FIG. 3 shows 300 according to an exemplary embodiment of the invention a hollow-cored porous suture ring 310 with thickness of hollow core and wall of the ring—half a ring cut crosswise.
Figure 4:
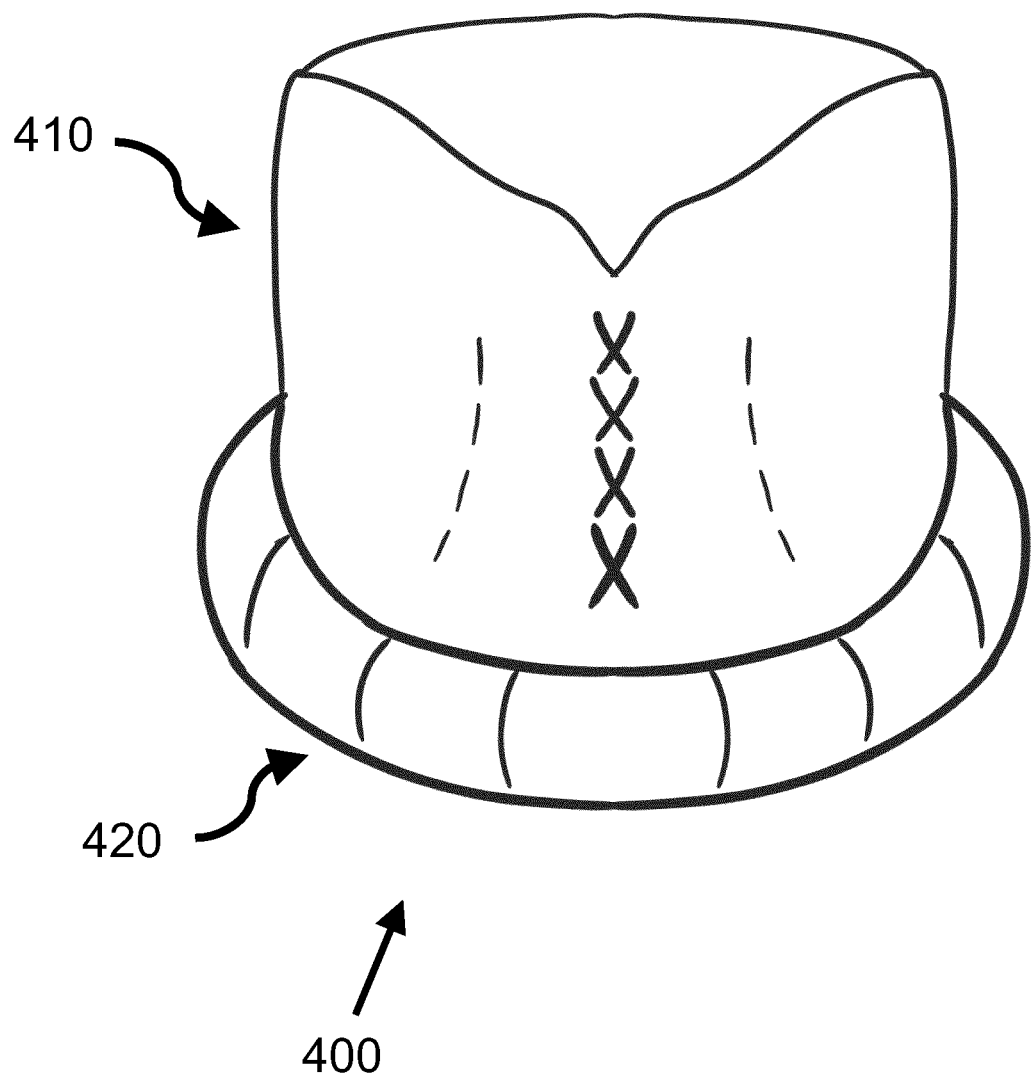
FIG. 4 shows 400 according to an exemplary embodiment of the invention a surgical valve with the leaflet material 410 and the hollow-cored porous suture ring 420.

Based on this method, a suture ring is produced that has the form of a hollow closed ring made out of electrospun fibers from the polymer (FIG. 3). The hollow feature is the crux of the invention and makes the ring flexible. Surgeons would be easily able to place sutures in the electrospun sewing ring. FIG. 4 shows a workable example of a surgical valve with an electrospun polymer hollow sewing ring attached to it.

Exemplary Technical Specifications of Hollow Polymer Sewing Ring
 1. Wall thickness: 100-1000 micrometers (in particular 200-500 micrometers), but not limited to this range (FIG. 3).
 2. Hollow core diameter: 0.1-3 millimeters (in particular 1-3 mm) (FIG. 3).
 3. Typical sizes for suture rings can be spun using different diameter in targets are application dependent and can range from 10-22 millimeters, 18-23 millimeters, or 25-40 millimeters (in particular 23 mm, 24 mm, 25 mm and 26 mm are preferred). Note this is the overall inner diameter of the suture ring.
 4. The porous suture ring has a pore size distribution of 5 to 50 micrometers.

The hollow-cored porous suture ring should be flexible enough and not too rigid so that surgeons can easily go through with a needle and suture. It is desirable to have a stiffness in the same range or superior to state-of-the-art suture rings. Leakage volume and regurgitate fraction in hydrodynamic tests should be in the same range or superior to competitive surgical valves on the market.

Based on a touch and feel test of surgeons in the field, a wall thickness of 350 micrometers and a hollow core of 2 millimeters diameter was experienced positive on stiffness and flexibility. Thus, the wall thickness of the hollow polymer ring should not be too thick, but also not too thin. As an assumption, a minimum of 100 micrometers and a maximum of 1000 micrometers on wall thickness will give the correct stiffness and a hollow core of 0.1-3 millimeters diameter will contribute to the flexibility.

Definition of Polymer for the Embodiments in this Invention

The supramolecular polymer referenced herein may include:
 the ureido-pyrimidinone (UPy) quadruple hydrogen-bonding motif (pioneered by Sijbesma (1997), Science 278, 1601-1604) and a polymer backbone, for example selected from the group of biodegradable polyesters, polyurethanes, polycarbonates, poly(orthoesters), polyphosphoesters, polyanhydrides, polyphosphazenes, polyhydroxyalkanoates, polyvinylalcohol, polypropylenefumarate. Examples of polyesters are polycaprolactone, poly(L-lactide), poly(DL-lactide), poly(valerolactone), polyglycolide, polydioxanone, and their copolyesters. Examples of polycarbonates are poly(trimethylenecarbonate), poly(dimethyltrimethylenecarbonate), poly(hexamethylene carbonate).

The same result may be obtained with alternative, non-supramolecular polymers, if properties are carefully selected and material processed to ensure required characteristics. These polymers may comprise biodegradable or non-biodegradable polyesters, polyurethanes, polycarbonates, poly(orthoesters), polyphosphoesters, polyanhydrides, polyphosphazenes, polyhydroxyalkanoates, polyvinylalcohol, polypropylenefumarate. Examples of polyesters are polycaprolactone, poly(L-lactide), poly(DL-lactide), poly(valerolactone), polyglycolide, polydioxanone, and their copolyesters. Examples of polycarbonates are poly(trimethylenecarbonate), poly(dimethyltrimethylenecarbonate), poly(hexamethylene carbonate).

The invention claimed is:

1. A surgical heart valve, comprising: heart valve leaflets, which are porous and made of bioabsorbable polymers, and a ring, wherein the ring is connected at a bottom of the heart valve leaflets, and wherein the ring is the only part of the surgical heart valve in direct contact with and sewn directly to a patient's heart tissue at time of implantation,
   wherein the ring is a rolled-up cylinder that has a continuous hollow-core throughout the ring in a direction orthogonal to a cross-section of the ring, wherein the rolled-up cylinder has no attachment points to form the ring,
   wherein the ring is porous and consisting of bioabsorbable polymers,
   wherein the cross-section of the ring defining a hollow-core diameter in the cross-section of the ring, and a wall thickness in the cross-section of the ring,
   wherein the ring defining an overall ring diameter in a planar view of the ring, and
   wherein the heart valve as a whole is bioabsorbable and therewith capable of being absorbed and replaced by natural tissue due to ingrowth of cells and nutrients into pores of the heart valve.

2. The surgical heart valve as set forth in claim 1, wherein the ring having a pore size distribution of 5 to 50 micrometers.

3. The surgical heart valve as set forth in claim 1, wherein the hollow core in the cross-section of the ring has a diameter is between 0.1-3 millimeters.

4. The surgical heart valve as set forth in claim 1, wherein the wall thickness in the cross-section of the ring is between 100-1000 micrometers.

5. The surgical heart valve as set forth in claim 1, wherein the overall inner ring diameter in the planar view of the ring is between 10-22 millimeters.

6. The surgical heart valve as set forth in claim 1, wherein the overall inner ring diameter in the planar view of the ring is between 18-28 millimeters.

7. The surgical heart valve as set forth in claim 1, wherein the overall inner ring diameter in the planar view of the ring is between 25-40 millimeters.

* * * * *